Patented May 1, 1928.

1,668,439

UNITED STATES PATENT OFFICE.

WILLIAM BURTON WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS.

ABRASIVE ARTICLE.

No Drawing.   Application filed January 11, 1927.   Serial No. 160,532.

This invention relates to abrasive articles; and it comprises an abrasive article, such as an abrasive wheel, composed of abrasive grains bonded by a cured rubber binder reinforced by distributed asbestos fiber; all as more fully hereinafter set forth and as claimed.

Abrasive article are ordinarily made of granules of an abrasive such as carborundum (silicon carbid), emery, alundum (fused alumina), etc., bonded together, hard rubber being frequently used as the binder. Rubber in this relation has many advantages and some disadvantages. In bonding with rubber on the mill, the abrasive grains are shattered and comminuted to some extent in the long work on the mill necessary to secure even distribution of the desirable small proportions of binder. In another application Serial No. 601,910, filed Nov. 18, 1922, whereon the present invention is in some respects an improvement, I have described a desirable way of making these articles. In this way latex is used as a source of bonding rubber. As it is a thin mobile liquid the assemblage of the abrasive grains and binder becomes a simple mixing operation and no long mechanical work is necessary. Therefore no flouring of the grains occurs and it is possible to make extremely compact wheels by using two grain sizes in the mix; these grain sizes not being altered in mixing. By that invention I am able to reduce the rubber binder to a very small amount; making a wheel which is practically all abrasive material without forfeiting any strength since the binder exists as very thin layers or films. In the invention of the acknowledged application I have further secured some important advantages by incorporating a certain proportion of cotton or other vegetable fiber into the rubber forming the bond of the wheel. This fiber gives an extremely desirable reinforcement; a reinforcement which is impossible to obtain on the mill. On the mill cotton is quickly reduced to dust and particularly where abrasive grains form a component of the mix. In the present invention I proceed in much the same way as in the acknowledged application, but in lieu of cotton or other vegetable fiber I use asbestos fiber. Asbestos gives sufficient reinforcement for the present purposes and it is much more heat resistant, suffering less in vulcanization and in the use of the wheel.

It is however a matter of some difficulty to incorporate ordinary commercial latex into asbestos fiber since asbestos often exercises a specific coagulative power. Latex does not penetrate and permiate it prior to coagulation as it does with cotton fiber. The asbestos can be freed from this coagulative power however by a preliminary extraction with acid. The acid extracted material is made fluffier and to that extent better adapted for the present purposes and after washing and drying it becomes miscible with ordinary commercial latex. In another application Serial No. 161,026, filed January 13, 1927, I have described and claimed the manufacture of various asbestos-reinforced rubber articles by a process involving this principle. Latex may be made immune to the coagulative action of ordinary asbestos by the expedient of adding a protective colloid. Either of these expedients may be employed in making the abrasive articles of the present invention.

In a typical embodiment of the present invention making a silicon carbid wheel bonded with rubber carrying an asbestos reinforcement, 1000 parts of granular abrasive, which may be in one or in two sizes, are mixed with 25 parts of good commercial asbestos and 100 parts of sulfur; mixing being either dry or wet. In the latter event about 200 parts of water may be used. The quantity of sulfur indicated is for making a hard cured final product. More sulfur can be used and doing this has some advantages. Where a less degree of cure is wanted the quantity of sulfur is reduced to less than 50 parts. This mixture is next formed into a dough with diluted latex, containing a protective colloid to prevent coagulation occurring during incorporation. As I use but a small amount of rubber in my bond, intimate and uniform distribution of the latex is required prior to any substantial separation of rubber therefrom. In this distribution the asbestos aids by a sort of wick action and it moreover holds the latex in place during drying. The best protective colloid I know for this purpose is that proposed by one Day, being hemoglobin, or the "red end" of blood as separated from the serum in a liquid separator. For the quantities and materials so far specified I use 100 parts of rubber which can be furnished by 300 parts by weight of commercial 30 per cent latex, dissolving in it 25 parts (dry basis) hemoglobin. Instead of using protected latex and ordinary asbestos, I can use acid extracted asbestos and ordinary commercial latex; all quantities remaining the same. The dough is shaped into the desired article in any convenient way; it may be extruded as rods; rolled into sheets, etc. The molded article is next dried at a low temperature; which is best done in vacuo at a shelf temperature, toward the end of the drying, not exceeding 150° F. Under these conditions the water evaporates, leaving a porous article of the proper shape containing films of gelled rubber. This article is compacted under heavy pressure while still warm, giving the final shape and dimensions desired. Under pressure the clean cellular rubber surfaces weld together. The article is now cured or vulcanized, using the ordinary means and methods. Where the initial shape is a rod or tube, disks or wheels may be cut from it at any stage in the described operation; and the same is true of sheets. Cutting after drying and before compaction is generally best.

As stated, the same procedure may be followed where the use of a protective colloid is not resorted to; the asbestos in this case being first extracted with acid. Commercial asbestos may be treated with boiling 5 per cent hydrochloric or sulfuric acid for 10 or 15 minutes, washed free of acid and then dried. It no longer has any coagulative action on latex. On the other hand latex now permeates and penetrates it as it would an ordinary vegetable fiber.

In the complete article made under the present invention the abrasive grains are bonded and spaced by intervening films of hard rubber containing distributed asbestos as a reinforcing fiber. The rubber is an integral body enclosing and bonding the abrasive grains and containing and permeating the reinforcing fiber. The proportion of fiber being small it acts merely as a reinforcement and carrier for the rubber.

In this and other relations, I find there is a dividing line between rubber-fiber compositions which have the general properties of cemented fiber and those having the general rubber properties with the fiber acting merely as a reinforcement. This dividing line is somewhere in the neighborhood of 65 volumes of rubber to 35 of fiber, but practically 25 per cent of fiber is a safer maximum limit. In making rubber bonded abrasive articles under the present invention, the proportion of asbestos to rubber in the bond is kept below this limit; as in the example given. However because of this reinforcement I am able to produce a wheel or other shape with a minimum amount of binder and, therefore, a maximum of abrasive, and yet one of great strength and resistance to shattering and chipping.

In abrasive wheels under the present invention the major portion of the wheel is abrasive matter and the binder is present in but small amount. In this binder however the relation stated exists between the volume of the rubber and that of the asbestos. In most embodiments of my invention I use gelled rubber; the form in which rubber is produced by drying latex without coagulation. Gelled rubber resembles long milled coagulation rubber and gives articles of great strength. Where coagulation rubber is wanted, the doughed materials after shaping are given an acid bath and allowed to stand to permit coagulation to penetrate inwardly; a matter of some time. The first action of the acid is to produce instantaneously an impervious skin within which coagulation goes on more slowly. Acetic acid of about 30 per cent is of suitable strength. After coagulation the rest of the process, drying, compaction and vulcanization, is as described.

What I claim is:—

1. An abrasive article composed of granules of abrasive material bonded together by films of gelled latex rubber, said rubber containing a minor amount of distributed asbestos fiber.

2. An abrasive article composed of granules of abrasive material bonded together by films of latex rubber, said rubber containing a minor amount of distributed asbestos fiber.

3. An abrasive article composed of granules of abrasive material bonded together by films of latex rubber, said rubber containing a minor amount of distributed asbestos fiber and also containing hemoglobin.

In testimony whereof, I have hereunto affixed my signature.

WILLIAM BURTON WESTCOTT.